United States Patent [19]
Thomas et al.

[11] Patent Number: 5,261,277
[45] Date of Patent: Nov. 16, 1993

[54] RESONATOR MICRO-ACCELEROMETER

[75] Inventors: Isabelle Thomas; Pierre O. Lefort, both of Valence, France

[73] Assignee: Sextant Avionique, Cedex, France

[21] Appl. No.: 764,320

[22] Filed: Sep. 24, 1991

[30] Foreign Application Priority Data

Sep. 25, 1990 [FR] France .................. 90 12080

[51] Int. Cl.⁵ .................................................. G01P 15/10
[52] U.S. Cl. .................................................. 73/517 AV
[58] Field of Search ..................... 73/517 AV, DIG. 1

[56] References Cited

U.S. PATENT DOCUMENTS

| | | | |
|---|---|---|---|
| 4,663,972 | 5/1987 | Gerard | 73/517 R |
| 4,732,647 | 3/1988 | Aine . | |
| 4,851,080 | 7/1989 | Howe et al. | 73/517 AV |
| 4,893,509 | 1/1990 | MacIver et al. | 73/517 AV |
| 4,939,935 | 7/1990 | Amand | 73/517 AV |
| 5,000,817 | 3/1991 | Aine . | |

FOREIGN PATENT DOCUMENTS 0157663 10/1985 European Pat. Off. .
2-248867 10/1990 Japan ..................... 73/517 AV

OTHER PUBLICATIONS

IEEE Proceedings, 89CH2704-5 by Benecke, entitled "Micromechanical Sensors", 1989, pp. 3-39-3-47.

Primary Examiner—John E. Chapman
Attorney, Agent, or Firm—Lowe, Price, LeBlanc & Becker

[57] ABSTRACT

A resonator micro-accelerometer sensitive to accelerations along a first direction comprises, between two supporting plates, an intermediate plate etched so as to include a rectangular frame, the sides of which extend along a first (x) and a second (y) direction perpendicular to the first one. The two directions are orthogonal to a third direction (z). A seismic mass is located inside the frame. Hanging rods extend between the frame and the mass along the second direction, on both sides of the mass. The rods have substantially the same thickness as the mass and the frame along the third direction and a small width along the first direction. Resonators extend between the frame and mass and have a small thickness along the third direction.

4 Claims, 2 Drawing Sheets

RESONATOR MICRO-ACCELEROMETER

BACKGROUND OF THE INVENTION

The present invention relates to an accelerometer structure and a manufacturing method for such a structure.

Over the past years various types of microaccelerometers have been developed as well as other micro components using manufacturing techniques analogous to those of integrated circuits.

Known monolith structures comprise a seismic mass supported by supporting elements coupled to a frame. Hanging means are generally designed so that the seismic mass can move perpendicularly to its plane. The detection of the displacement of the seismic mass is conventionally made either by detecting a variation of the capacitance between the plane of the mass and a metallized plane formed in a support enclosure or by detecting the deformations of the supporting elements.

On the other hand, non-monolithic accelerometers wherein the detection is made by resonators are known. This type of detector is more accurate and provides information easier to process.

SUMMARY OF THE INVENTION

An object of the invention is to provide a plane and monolithic directive micro-accelerometer wherein the detection is made by resonators monolithically incorporated in the sensor body.

The invention provides a new type, of monolithic micro-accelerometer wherein the supporting elements are designed to authorize the displacement of the seismic mass in a direction within the plane of the mass and not perpendicularly to the plane, and wherein the detection of the seismic mass displacement in the related direction is achieved by measuring the variation of the resonance frequency of resonators coupled to the mass.

More particularly, the invention provides a micro-accelerometer including resonators sensitive to accelerations along a first direction comprising, between two supporting plates, an intermediate plate etched so as to comprise a rectangular frame, the sides of which extend along the first direction and a second direction perpendicular to the first one, the directions being orthogonal with respect to a third direction; a seismic mass inside the frame; two hanging rods extending between the frame and the mass along the second direction, on both sides of the mass, and coupling the frame to the mass, the rods having substantially the same thickness as the mass and the frame with respect to the third direction and a small width with respect to the first direction; two components constituting resonators extending between the frame and the mass and having a small thickness with respect to the third direction; means for exciting the resonators; and means for detecting the vibration frequency of the resonators.

According to an embodiment of the invention, each of the two components constituting the resonators is formed by a strip extending between the frame and the mass along the first direction, on both sides of the mass, and coupling the frame to the mass.

According to an embodiment of the invention, each resonator faces a supporting opposite plate, each supporting plate including exciting means for the corresponding resonator.

According to an embodiment of the invention, the intermediate plate is made of quartz and each resonator is provided with metallizations adapted to excite it through piezoelectric effect.

According to a further embodiment of the invention, the intermediate plate is made of silicon.

On the other hand, in case the active portion of the sensor is made of silicon, the invention provides a method for manufacturing a resonator micro-accelerometer comprising the following steps:

forming a silicon plate, the main surfaces of which are within planes (100), the first and second directions being parallel to the crystallographic direction [110];

preetching each surface of the silicon plate in front of the position of each resonator;

masking the positions where the frame, the resonators (excepting on the pre-etched side), the seismic mass and the hanging rods have to be positioned; and chemically etching with an etchant causing etching preferably extending along planes (111) then along planes (110) until the resonators have the desired thickness;

whereby, if the etching masks of the hanging rods have appropriate sizes, the rods have a thickness equal to that of the intermediate plate and a width along the first direction small with respect to this thickness.

BRIEF DESCRIPTION OF THE DRAWINGS

The foregoing and other objects, features and advantages of the invention will be apparent from the following detailed description of preferred embodiments as illustrated in the accompanying figures wherein.

DETAILED DESCRIPTION OF THE INVENTION

Figure 1:
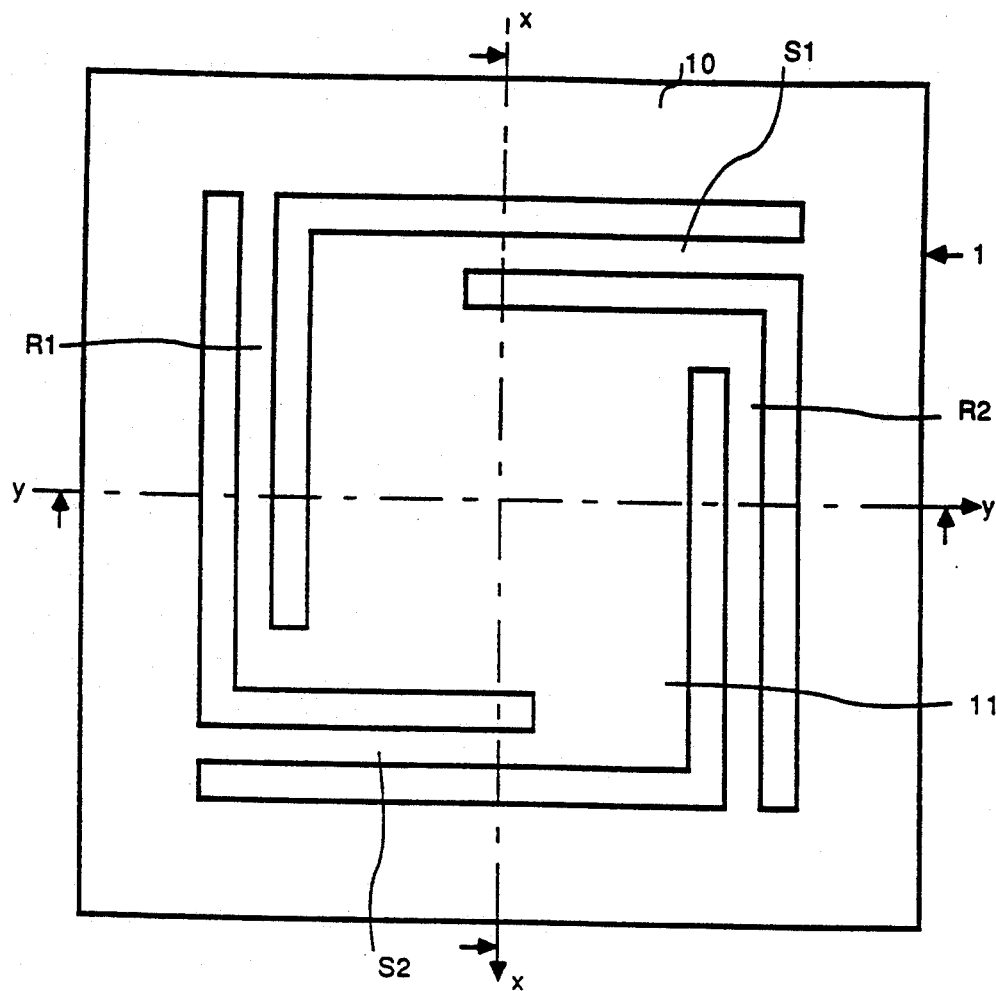
FIG. 1 is a schematic top view of a micro-accelerometer according to the invention.
Figure 2:
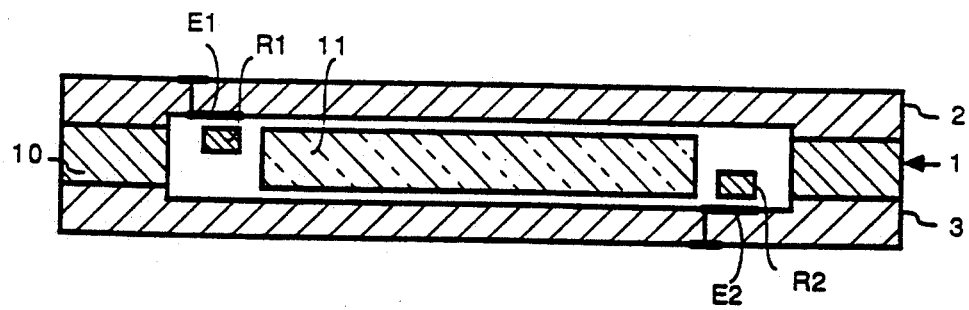
FIG. 2 is a section view along line y—y of FIG. 1.
Figure 3:
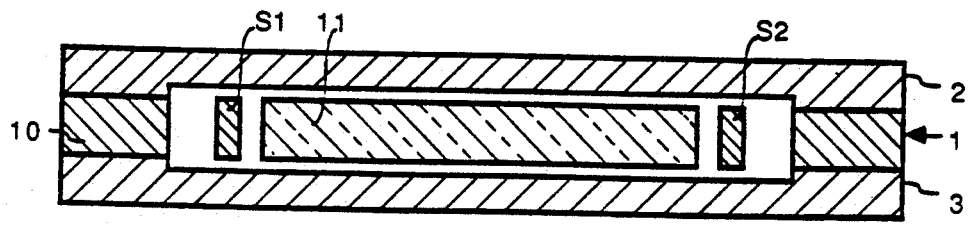
FIG. 3 is a section view along line x—x of FIG. 1.

The general shape of a micro-accelerometer according to the invention is illustrated as a top view in FIG. 1 and as a section view according to two orthogonal planes in FIGS. 2 and 3. As shown in FIGS. 2 and 3, the micro-accelerometer conventionally includes an intermediate plate 1, constituting the main part of the sensor, inserted between two plates used as supporting and protecting means 2 and 3.

FIG. 1 is a schematic top view of the intermediate plate 1. The plate is etched to include a rectangular frame 10, shown in the present example as a square, and a central seismic mass 11 arranged inside the frame. Hanging rods S1 and S2 couple the mass 11 to the frame 10 and resonators R1 and R2 are positioned between the mass 11 and frame 10.

The hanging rods S1 and S2 are designed so as to be flexible along the sensitivity direction x—x of the accelerometer and rigid in the other two directions, that is, along the axis y—y and along the orthogonal axis z—z. The hanging rods extend according to their biggest length parallel to the axis y—y, and have a thickness according to the axis z equal to the thickness of the seismic mass and frame, that is, the initial thickness of the intermediate plate 1. Along the x direction, the hanging rods have a width smaller than their thickness. Thus, the seismic mass can move substantially only in the direction of the x axis, the components of the acceleration in the orthogonal directions having no effect.

In order to detect the possible displacement of the seismic mass 11 in the direction of the x axis, are provided two resonators, according to the embodiment described by way of example, constituted by two strips R1 and R2 extending between the seismic mass and the frame along the direction of the x axis. In order to have a high sensitivity, the resonators have a small thickness along the direction of the z axis and are positioned so as to face an assembly of exciting and detecting electrodes positioned on the supporting plate in front of which they are arranged.

Preferably, as shown in FIG. 2, the resonators are symmetrically arranged with respect to the center of the seismic mass, which permits compensating possible manufacturing errors and to reduce the sensitivity along the z axis. In this case, each of resonators R1 and R2 is associated to electrodes E1 and E2 arranged on the supporting plates 2 and 3, respectively.

The means for exciting and detecting the resonators will not be described here since those skilled in the art know various ways to achieve these functions.

As shown in FIGS. 2 and 3, the supporting or protecting plates 2 and 3 abut against the frame 10 and entirely surround the assembly of the seismic mass, hanging rods and resonators. The chamber in which is positioned this assembly can be placed under a vacuum or a controlled atmosphere.

The material constituting the intermediate plate 1 and wherein are etched the above components can be selected among the various materials used for the manufacturing of micro-components.

For example, it is possible to use single-crystal quartz which, when properly oriented, is etched orthogonally with respect to its main surfaces in HF and NH4F solutions. In that case, the resonators will be provided with metallizations adapted to excite them through piezoelectric effect.

A specific method for manufacturing the structure according to the invention will now be described, by way of example, in the case the intermediate plate is made of silicon.

This manufacturing method will be described in relation with FIGS. 4 and 5 which are not drawn to scale with respect to the previous figures but are only designed to illustrate the invention. Also, the ratio between the vertical and horizontal dimensions is not to scale. On the other hand, the manufacturing of a single component is described here. It will be clear for those skilled in the art that numerous identical components are liable to be simultaneously constituted on a silicon layer commonly having a thickness ranging from 0.3 to 0.5 mm.

Figure 4:
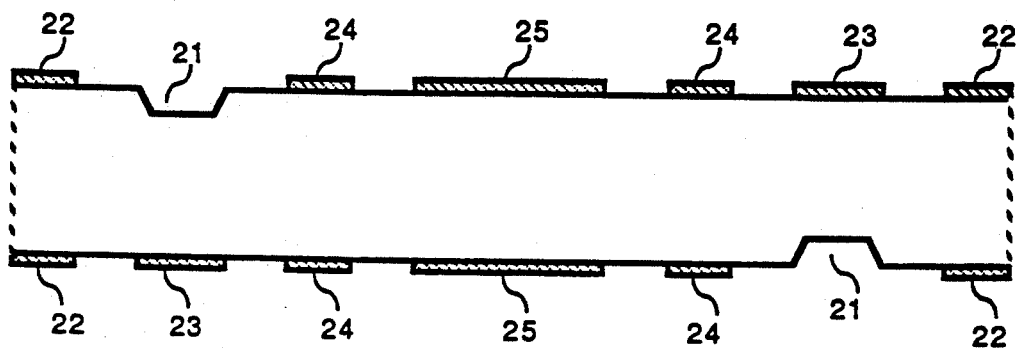
FIGS. 4 and 5 show successive manufacturing steps of a micro-accelerometer according to the invention, the active portion of which is made of silicon.

As shown in FIG. 4, one starts from a silicon layer wherein preetchings 21 are achieved in front of the positions where resonators are to be formed. Then, an etching mask is formed and comprises regions 22 for delineating the frame region, regions is 23 for delineating the resonator strips, regions 24 for delineating hanging rods and regions 25 for delineating the seismic mass. Regions 22, 24 and 25 are symmetrical on both surfaces. Regions 23 are provided on one surface facing preetchings 21.

According to the invention, the silicon layer is initially oriented so that its main surfaces are in a crystallographic plane (100) and directions x and y are selected so as to be parallel to direction [110]. Under these conditions, etching is achieved by an etching solution such as ethylene-diamine-pyrocathecol or KOH causing an anisotropic recess in the silicon. If etching is continued until the desired depth is reached for resonators R1 and R2, the structure illustrated in FIG. 5, wherein the same references are used to designate the same components as in FIGS. 1 and 3, is achieved.

Figures 6A, 6B:
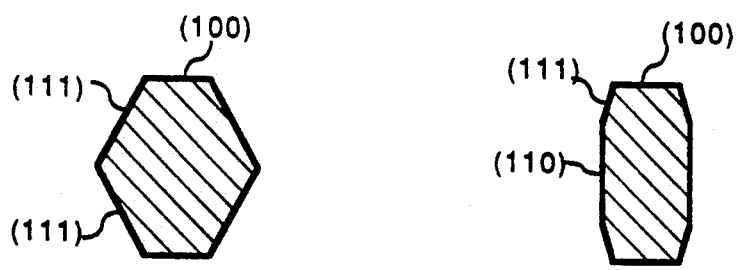
FIGS. 6A and 6B show a section view of a hanging rod according to the invention during successive etching steps.

More particularly, the effect of the above etchants is illustrated in FIGS. 6A and 6B in relation with the etching of a hanging rod. In a first step, etching extends along planes (111) and, then, when two planes (111) from the lower surface and upper surface meet, as shown in FIG. 6A, etching continues along planes (110) as shown in FIG. 6B. Therefore, a single etching operation directly provides the desired shape of the hanging rod having a width smaller than its thickness, the width being determined by the initial selection of the size of masking areas 24 (FIG. 4).

Thus, the invention provides a particularly simple and fast manufacturing method since it resorts to a wet etching process much faster and simpler to implement than a dry etching process (reactive ionic etching or ion milling), these latter methods having the drawbacks of being complex, slow and risky when large thicknesses have to be etched, which is the case in the invention where it is desired to entirely eliminate the silicon on the whole thickness of a wafer.

Figure 5:
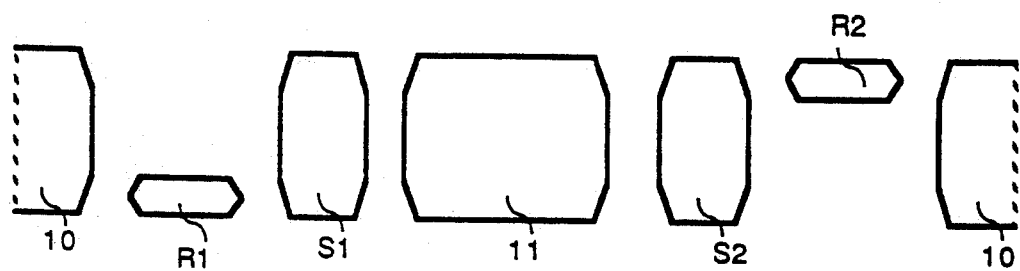

Moreover, the invention has the advantage of requiring only two etching steps: a preetching such as shown in FIG. 4 and a final etching such as shown in FIG. 5.

The invention is liable of numerous variants which will appear to those skilled in the art, especially as regards the exact shape of the frame and seismic mass, the shapes of the connection regions between the frame, on the one hand, the seismic mass on the other, and the resonators and hanging rods. The position of the connecting points of the hanging rods to the seismic mass will be selected so as Lo optimize the accelerometer directivity, and the position of the connecting points of the resonator strips to the frame and seismic mass constitutes, in relation with their thickness, a means for selecting their fundamental vibration frequency.

Various techniques for exciting and detecting the resonator vibration can be used. Similarly, there are various techniques for forming and mounting the protection plates. For example, it is possible to use intermediate layers, to provide vias and various mounting means between the different plates, the most usual means nowadays being anodic welding. The material of the protection plates will be adapted to the material of the intermediate plate; for example, if the intermediate plate is made of quartz, it is now preferred to use a ceramic body.

We claim:

1. A resonator micro-accelerometer sensitive to accelerations along a first direction comprising, between two supporting plates, an intermediate plate etched so as to include:

a rectangular frame, the sides of which extend along a first and a second direction perpendicular to the first one, said two directions being orthogonal to a third direction a seismic mass inside the frame;

two hanging rods extending between the frame and the mass along the second direction, on both sides of the mass, and connecting the fame to the mass, said rods having substantially the same thickness as the mass and frame along the third direction and a width along the first direction smaller than the thickness along the third direction two components constituting resonators extending between the frame and the mass and having a thickness along the third direction smaller than their width along the second direction;

means for exciting the resonators; and means for detecting the vibration frequency of the resonators.

2. A resonator micro-accelerometer according to claim 1, wherein each of the two components constituting said resonators is formed by a strip extending between the frame and the mass along the first direction, on both sides of the mass, and connecting the frame to the mass.

3. A resonator micro-accelerometer according to claim 1, wherein each resonator is arranged so as to face an opposite supporting plate, each supporting plate including means for exciting the corresponding resonator.

4. A resonator micro-accelerometer according to claim 1, wherein said intermediate plate is made of silicon.

* * * * *